United States Patent [19]
Wood

[11] Patent Number: 5,779,743
[45] Date of Patent: Jul. 14, 1998

[54] METHOD FOR MAKING ABRASIVE GRAIN AND ABRASIVE ARTICLES

[75] Inventor: William P. Wood, Golden Valley, Minn.

[73] Assignee: Minnesota Mining and Manufacturing Company, St. Paul, Minn.

[21] Appl. No.: 715,682

[22] Filed: Sep. 18, 1996

[51] Int. Cl.⁶ .................................................. C09C 1/68
[52] U.S. Cl. ........................ 51/309; 501/153; 264/6; 264/7
[58] Field of Search .................... 51/309, 293; 501/153, 501/12; 264/6, 7

[56] References Cited

U.S. PATENT DOCUMENTS

| | | | |
|---|---|---|---|
| 4,202,870 | 5/1980 | Weber et al. | 423/630 |
| 4,314,827 | 2/1982 | Leitheiser et al. | 51/298 |
| 4,518,397 | 5/1985 | Leitheiser et al. | 51/293 |
| 4,574,003 | 3/1986 | Gerk | 51/309 |
| 4,623,364 | 11/1986 | Cottringer et al. | 51/309 |
| 4,676,928 | 6/1987 | Leach et al. | 252/313.1 |
| 4,744,802 | 5/1988 | Schwabel | 51/309 |
| 4,770,671 | 9/1988 | Monroe et al. | 51/293 |
| 4,799,938 | 1/1989 | Janz et al. | 51/293 |
| 4,848,041 | 7/1989 | Kruschke | 51/309 |
| 4,881,951 | 11/1989 | Wood et al. | 51/309 |
| 4,954,462 | 9/1990 | Wood et al. | 501/95 |
| 4,964,883 | 10/1990 | Morris et al. | 51/293 |
| 4,988,370 | 1/1991 | Haynes, Jr. | 51/309 |
| 4,997,461 | 3/1991 | Markhoff-Matheny et al. | 51/295 |
| 5,009,676 | 4/1991 | Rue et al. | 51/309 |
| 5,011,508 | 4/1991 | Wald et al. | 51/293 |
| 5,035,723 | 7/1991 | Kalinowski et al. | 51/309 |
| 5,090,968 | 2/1992 | Pellow | 51/293 |
| 5,094,672 | 3/1992 | Giles, Jr. et al. | 51/309 |
| 5,139,978 | 8/1992 | Wood | 501/127 |
| 5,152,917 | 10/1992 | Pieper et al. | 51/295 |
| 5,160,509 | 11/1992 | Carman et al. | 51/307 |
| 5,164,348 | 11/1992 | Wood | 501/127 |
| 5,185,299 | 2/1993 | Wood et al. | 501/95 |
| 5,201,916 | 4/1993 | Berg et al. | 51/293 |
| 5,213,591 | 5/1993 | Celikkaya et al. | 51/293 |
| 5,219,806 | 6/1993 | Wood | 501/127 |
| 5,227,104 | 7/1993 | Bauer | 264/56 |
| 5,304,331 | 4/1994 | Leonard et al. | 264/141 |
| 5,366,523 | 11/1994 | Rowenhorst et al. | 51/293 |
| 5,372,620 | 12/1994 | Rowse et al. | 51/309 |
| 5,429,647 | 7/1995 | Larmie | 51/295 |
| 5,431,705 | 7/1995 | Wood | 51/309 |
| 5,435,816 | 7/1995 | Spurgeon et al. | 51/295 |
| 5,489,204 | 2/1996 | Conwell et al. | 423/153 |
| 5,498,269 | 3/1996 | Larmie | 51/295 |
| 5,500,273 | 3/1996 | Holmes et al. | 428/147 |
| 5,516,348 | 5/1996 | Conwell et al. | 51/309 |
| 5,527,369 | 6/1996 | Garg | 51/309 |
| 5,551,963 | 9/1996 | Larmie | 51/307 |
| 5,551,964 | 9/1996 | Wood | 51/309 |

FOREIGN PATENT DOCUMENTS

WO 96/32226  10/1996  WIPO.

OTHER PUBLICATIONS

D. Brewis et al., "Reduction In Contact Adhesion", *J. of Adhesion*, vol. 26, 1988, pp. 230–233.

Magnesium Elektron brochure, "An Introduction to Zirconium–Polymer Interactions", 2 pages, Nov. 7, 1996.

*Primary Examiner*—Deborah Jones
*Attorney, Agent, or Firm*—Gregory D. Allen

[57] ABSTRACT

Method for making alpha alumina-based abrasive grain from a dispersion comprising boehmite. The abrasive grain can be incorporated into abrasive products such as coated abrasives, bonded abrasives, and non-woven abrasives.

26 Claims, 3 Drawing Sheets

METHOD FOR MAKING ABRASIVE GRAIN AND ABRASIVE ARTICLES

FIELD OF THE INVENTION

The present invention relates to a method for making alpha alumina-based abrasive grain from a dispersion comprising boehmite. The abrasive grain can be incorporated into abrasive products such as coated abrasives, bonded abrasives, and non-woven abrasives.

DESCRIPTION OF RELATED ART

Fused alumina abrasive grain have been utilized in abrasive applications for close to one hundred years. Such abrasive grain are made by heating an alumina source above its melting point, quenching, and then crushing to form alumina abrasive grain or particles.

In the early 1980's a new and substantially improved type of alumina abrasive grain, commonly referred to as "sol gel" or "sol gel-derived" abrasive grain, was commercialized. In general, sol gel abrasive grain are made by preparing a dispersion or sol comprising water and alumina monohydrate (boehmite), gelling the dispersion, drying the gelled dispersion, crushing the dried dispersion into particles, calcining the particles to remove volatiles, and sintering the calcined particles at a temperature below the melting point of alumina. Frequently, the dispersion also includes one or more oxide modifiers, nucleating agents, and/or precursor thereof. In addition, there are some teachings wherein dried and/or calcined particles are impregnated with one or more oxide modifiers, nucleating agents, and/or a precursors thereof. Further details regarding sol gel abrasive grain, including methods for making them, can be found, for example, in U.S. Pat. Nos. 4,314,827 (Leitheiser et al.), 4,518,397 (Leitheiser et al.), 4,623,364 (Cottringer et al.), 4,744,802 (Schwabel), 4,770,671 (Monroe et al.), 4,881,951 (Wood et al.), 5,011,508 (Wald et al.), 5,090,968 (Pellow), 5,139,978 (Wood), 5,201,916 (Berg et al.), 5,227,104 (Bauer), 5,366,523 (Rowenhorst), 5,429,647 (Larmie), 5,498,269 (Larmie), and 5,551,963 (Larmie).

In general, the viscosity of a boehnite dispersion or sol increases as its solids content increases. Further, the addition of metal oxide precursors such as metal nitrates, acetates, citrates, formates, and/or chlorides tend to increase the viscosity of the dispersion even beyond their effect on the solids content of the dispersion. Such increases in viscosity tend to increase, for example, the difficulty in providing a homogeneous mixture of components in the dispersions (also see, e.g., col. 1 line 13 to col. 2, line 8 of U.S. Pat. No. 5,227,104 (Bauer)).

Further with regard to the '104 patent, the disclosure of which is incorporated herein by reference, Bauer teaches extruding a gelled boehmite dispersion having a solids content greater than 30% by weight (preferably, between 45% and 75%) to form, after drying, calcining, and sintering, abrasive particles. Bauer also teaches that the addition of extremely fine $Al_2O_3$ seeds will allow the gel to sinter to greater than 90% theoretical density in only a few minutes without the presence of MgO as a sintering aid/grain growth inhibitor. The sintered material is said to have a submicron microstructure. Such a "seeded" ceramic abrasive material is said to perform much better than the MgO containing "unseeded" gel in many grinding applications. It is also said in the '104 patent that the MgO may still be added to the "seeded" gel but does not generally improve the performance any further and is often deleterious. Further, Bauer states that by eliminating magnesium salt additions, he has effectively removed the reason he provides at col. 1, lines 16–35 for "high water" requirements for the gel, and thereby allows the solids content to be increased by a factor of 2–3 (see col. 2, lines 22–44; also see col. 2, lines 9–18).

Other methods for making sol gel alpha alumina-based abrasive grain utilize an impregnation step wherein the dried or calcined material (i.e., ceramic precursor material) is impregnated with a composition that includes metal oxide, metal oxide precursor, and/or combinations thereof, and a liquid medium, to provide an impregnated abrasive grain precursor. After the impregnation step, the impregnated ceramic precursor material is typically dried and then calcined (generally, this is a second calcining step) to form an impregnated, calcined ceramic precursor material, which is in turn sintered (see, e.g., U.S. Pat. Nos. 4,770,671 (Monroe), 5,139,978 (Wood), 5,164,348 (Wood), 5,213,591 (Celikkaya et al.) and 5,011,508 (Wald et al.)).

In another aspect, a common step in conventional sol gel processes for making abrasive grain is crushing the dried gel (see, e.g., U.S. Pat. Nos. 4,314,827 (Leitheiser et al.), 4,518,397 (Leitheiser et al.), 4,744,802 (Schwabel), 4,770,671 (Monroe et al.), 4,881,951 (Wood et al.), and 5,139,978 (Wood)). The crushed material does not provide a single grade, or size range, of dried particles, but rather a large distribution of particle sizes. Particles less than about 60 micrometers are commonly referred to as "fines". In some instances, these fines are too small to be economically further processed into sintered abrasive particles using the same techniques (typically rotary calcining and sintering) used to further process the larger sized dried particles (see, e.g., U.S. Pat. No. 5,489,204 (Conwell et al.)). In many instances, these fines are sent to landfills or stored until a use for them can be found.

In an effort to eliminate the dried fines, attempts have been made to incorporate them back into the sol gel process (i.e., to recycle them into new dried particles, and ultimately into sintered abrasive grain). For example, U.S. Pat. No. 4,314,827 (Leitheiser et al.), the disclosure of which is incorporated herein by reference, teaches redispersing the fines in a sol or dispersion. A drop in abrading performance and other properties (e.g., density and hardness), however is experienced when too many fines are recycled. Further, in general, recycled material from sols or dispersions containing alpha alumina seeds typically exhibit a significantly lower percent decrease in abrading performance than does recycled material from sols or dispersions free of alpha alumina or alpha ferric oxide seeds. One need in the art is a process wherein such recycled material can be used to make abrasive grain having good abrading performance characteristics.

SUMMARY OF THE INVENTION

In general, the present invention provides a method for making alpha alumina-based ceramic abrasive grain, the method comprising the steps of.

(a) providing a dispersion preparable by (and typically prepared by) combining components comprising liquid medium (preferably aqueous), acid, greater than 35 percent by weight boehmite, based on the total solids content of the dispersion, and, on a theoretical metal oxide basis, at least 0.1 percent (preferably, in the range from at least 0.1 percent to about 10 percent; more preferably, in the range from about 0.5 to about 10 percent) by weight of at least one of metal oxide or precursor thereof, based on the total theoretical metal oxide content of the dispersion;

(b) converting the compacted dispersion to alpha alumina-based ceramic precursor material; and (d) sintering the precursor material to provide alpha alumina-based ceramic abrasive grain.

Optionally, the dispersion contains, on a theoretical metal oxide basis, less than 0.05 percent by weight of alpha alumina seeds or nucleating agent or nucleating material, based on the total theoretical metal oxide content of the dispersion, wherein it is understood that "less than 0.05 percent by weight of alpha alumina seeds or nucleating agent or nucleating material" includes zero percent by weight alpha alumina seeds, nucleating agent, or nucleating material, respectively.

Preferably, the dispersion is compacted (preferably, at a pressure of at least $3.5 \times 10^4$ kg/m$^2$ (50 lb/in$^2$) (more preferably, at least $1.05 \times 10^5$ kg/m$^2$ or even at least $1.4 \times 10^5$ kg/m$^2$) to the dispersion) prior to converting it to alpha alumina-based ceramic precursor material. Compacting the dispersion typically increases the density and significantly increases the abrading performance of the resulting abrasive grain in one or more abrading applications, particularly when compacted at a pressure of at least $3.5 \times 10^4$ kg/m$^2$.

In one preferred method according to the present invention the dispersion is preparable by (and typically prepared by) combining components comprising liquid medium (preferably aqueous), acid, greater than 35 percent (preferably, greater than 60 percent) by weight boehmite, based on the total solids content of the dispersion, and, on a theoretical metal oxide basis, at least 0.1 percent (preferably, in the range from at least 0.1 percent to about 10 percent; more preferably, in the range from about 0.5 to about 10 percent) by weight of at least one of metal oxide or precursor thereof, the dispersion containing, on a theoretical metal oxide basis, less than .05 percent by weight of alpha alumina seeds, based on the total theoretical metal oxide content of the dispersion.

In another preferred method according to the present invention the dispersion is preparable by (and typically prepared by) combining components comprising liquid medium (preferably aqueous), acid, greater than 35 percent (preferably, greater than 60 percent) by weight boehmite, based on the total solids content of the dispersion, and, on a theoretical metal oxide basis, at least 0.1 percent (preferably, in the range from at least 0.1 percent to about 10 percent; more preferably, in the range from about 0.5 to about 10 percent) by weight, based on the total theoretical metal oxide content of the dispersion, of at least one metal oxide precursor selected from the group consisting of a metal nitrate salt, a metal acetate salt, a metal citrate salt, a metal formate salt, and hydoxy iron polymer. Optionally, this dispersion is preparable by combining components comprising metal oxide precursor, liquid medium, acid, boehmite, and metal oxide sol.

In another preferred method according to the present invention the dispersion is preparable by (and typically prepared by) combining components comprising liquid medium (preferably aqueous), acid, greater than 35 percent (preferably, greater than 60 percent) by weight boehmite, based on the total solids content of the dispersion, and an acidic colloidal, metal oxide sol, the sol providing the dispersion, on a theoretical metal oxide basis, with at least 0.1 percent (preferably, in the range from 0.1 percent to about 10 percent; more preferably, in the range from about 0.5 to about 10 percent) by weight metal oxide, based on the total theoretical metal oxide content of the dispersion. Optionally, this dispersion may be is preparable by combining components comprising liquid medium, boehmite, metal oxide sol, and metal oxide precursor.

Certain preferred precursor materials utilized in the methods according to he present invention comprise, on a theoretical metal oxide basis, at least 0.1 percent (in some instances, preferably in the range from 0.1 percent to about 10 percent; or more preferably, in the range from about 0.5 percent to about 10 percent) by weight of metal oxide selected from the group consisting of MgO, CoO, NiO, $Ce_2O_3$, $ZrO_2$, $HfO_2$, $Li_2O$, MnO, $Cr_2O_3$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $TiO_2$, $Fe_2O_3$, $SnO_2$, and ZnO, based on the total theoretical metal oxide content of the calcined precursor material prior to sintering (or the sintered abrasive grain).

In one aspect, the present invention provides a method for making alpha alumina-based ceramic abrasive grain, the method comprising the steps of:

(a) preparing a first dispersion by combining components comprising liquid medium, acid, boehmite, and metal oxide precursor;

(b) drying the first dispersion to provided first alpha alumina-based precursor material;

(c) combining components comprising aqueous liquid medium, boehmite, and the first alpha alumina-based precursor material to provide a second, homogeneous dispersion comprising aqueous liquid medium, acid, greater than 60 percent by weight boehmite, based on the total solids content of the dispersion, and, on a metal oxide basis, at least 0.1 percent by weight, based on the total metal oxide content of the dispersion, of at least one metal oxide precursor selected from the group consisting of a metal nitrate salt, and a metal formate salt, the amount of the boehmite being greater than 60 percent by weight, based on the total weight of the dispersion;

(d) converting the second dispersion to second alpha alumina-based ceramic precursor material; and (e) sintering the second precursor material to provide alpha alumina-based ceramic abrasive grain having a density of greater than 90 percent of theoretical, wherein the method further comprises the step, prior to step (d), of compacting the second dispersion by application of pressure of at least $3.5 \times 10^4$ kg/m$^2$.

In this application:

"Boehmite" refers to alpha alumina monohydrate and boehmite commonly referred to in the art as "pseudo" boehmite (i.e., $Al_2O_3 \cdot xH_2O$, wherein x=1 to 2).

"Converting" refers to any step or series of steps that provide the precursor material, including deliquifying, and may include crushing, impregnating, and/or calcining.

"Ceramic precursor material" or "unsintered ceramic material" refers to deliquified or dried alumina-based dispersion (i.e., deliquified or dried ceramic precursor material) or calcined alumina-based dispersion (i.e., calcined ceramic precursor material), which are typically in the form of particles, that have a density of less than 80% (typically less than 60%) of theoretical, and are capable of being sintered and/or impregnated with an impregnation composition and then sintered to provide alpha alumina-based ceramic material.

"Alpha alumina-based ceramic abrasive grain" as used herein refers to sintered, polycrystalline ceramic abrasive grain that have been sintered to a density of greater than 90% (preferably, at least 92%, more preferably, at least 94%, or even at least 95% or 97%) of theoretical, and contain, on a theoretical metal oxide basis, at least 60% by weight $Al_2O_3$, wherein at least 50% by weight of the $Al_2O_3$ is present as alpha alumina.

"Dispersion" refers to a solid-in-fluid (liquid and/or liquid and gas (e.g., air)) system wherein one phase comprises finely divided particles (in the colloidal size range) distributed throughout a fluid, and/or the fluid is distributed throughout the particles.

"Colloidal metal oxide sol" refers to a stable (i.e., the metal oxide solids in the sol or dispersion do not appear by visual inspection to begin to gel, separate, or settle upon standing undisturbed for about 2 hours) suspension of colloidal particles (preferably in a liquid medium having a pH of less than 6.5).

"Hydroxy iron polymer" refers to hydrous iron polymers (HIP), also known as polynuclear ferric hydroxy complexes, which can have the formula, for example,

wherein (x+2q) has a value of 2.0 to 2.5, inclusively, and S is the charge of the counterion having a value of 1, 2, or 3, and n can be greater than 500, generally 600 to 1000, and counterion can be any water-solubilizing anion such as nitrate, chloride, perchlorate, or water-solubilizing carboxylates such as citrate and tartrate (also see, e.g., U.S. Pat. Nos. 4,954,462 (Wood et al.) and 5,185,299 (Wood et al.), the disclosures of which are incorporated herein by reference).

"Nucleating material" refers to material that enhances the transformation of transitional alumina(s) to alpha alumina via heterogeneous (i.e., extrinsic) nucleation. The nucleating material can be a nucleating agent (i.e., material having the same or approximately the same crystalline structure as alpha alumina, or otherwise behaving as alpha alumina itself (e.g., alpha alumina seeds, alpha $Fe_2O_3$ seeds, or alpha $Cr_2O_3$ seeds) or a precursor thereof.

Certain inventions described herein are claimed in co-pending application having U.S. Ser. No. 08/715,672 filed on the same date as the present application.

Abrasive grain made according to the methods of the present invention can be incorporated into abrasive products such as coated abrasives, bonded abrasives, and non-woven abrasives.

BRIEF DESCRIPTION OF THE DRAWINGS

FIGS. 4 and 6 are elevational plan views of an extruder useful in the methods according to the present invention, while

DETAILED DESCRIPTION OF PREFERRED EMBODIMENTS

Figure 1:
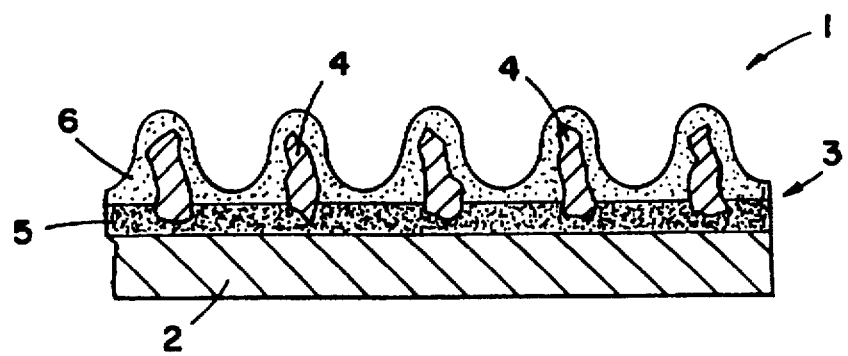
FIG. 1 is a fragmentary cross-sectional schematic view of a coated abrasive article including abrasive grain made according to the method of the present invention.

Preferably, the dispersion preparable by combining components comprising liquid medium, acid, metal oxide(s) and/or precursor(s) thereof, and at least 35 percent by weight boehmite is homogeneous.

The liquid medium in which the boehmite is dispersed is typically water (preferably deionized water), although organic solvents, such as lower alcohols (typically $C_{6-1}$ alcohols), hexane, or heptane, may also be useful as the liquid medium. In some instances, it is preferable to heat the liquid medium (e.g., 60°–70° C.) to improve the dispersibility of the boehmite.

Typically, the dispersion comprises at least about 20% by weight (generally from about 20% to about 65% by weight) liquid medium, based on the total weight of the dispersion. More typically, the dispersion comprises less than about 65% by weight or less liquid medium, although the dispersion may comprise, about 60% by weight or less, about 55% by weight or less, about 50% by weight or less, about 45% by weight or less, about 42% by weight or less, about 41% by weight or less, about 40% by weight or less, about 39% by weight or less, about 38% by weight or less, about 37% by weight or less, about 35% by weight or less, or about 25% by weight or less, liquid medium, based on the total weight of the dispersion.

In another aspect, the dispersion typically comprises greater than 35% by weight (generally from greater than 35% to about 80% by weight) solids, based on the total weight of the dispersion. Certain dispersions can, however, comprise 40% by weight or more, 45% by weight or more, 50% by weight or more, 55% by weight or more, 58% by weight or more, 59% by weight or more, 60% by weight or more, 61% by weight or more, 62% by weight or more, 63% by weight or more, 65% by weight or more, 75% by weight or more, or even 80% by weight or more solids, based on the total weight of the dispersion.

In another aspect, the dispersion typically comprises greater than 35% by weight (generally from greater than 35% to about 80% by weight) boehmite, based on the total weight of the dispersion. Certain dispersions can, however, comprise 40% by weight or more, 45% by weight or more, 50% by weight or more, 55% by weight or more, 58% by weight or more, 59% by weight or more, 60% by weight or more, 61% by weight or more, 62% by weight or more, 63% by weight or more, 65% by weight or more, 75% by weight or more, or even 80% by weight or more boehmite, based on the total weight of the dispersion.

Weight percents of solids and boehmite above about 80 wt-% may also be useful, but tend to be more difficult to process to make the abrasive grain provided by the method according to the present invention.

Suitable boehmite can be prepared using various techniques known in the art (see, e.g., U.S. Pat. Nos. 4,202,870 (Weber et al.), and 4,676,928 (Leach et al.), the disclosures of which are incorporated herein by reference). Suitable boehmite can also be obtained, for example, from commercial sources such as Condea Chemie, GmbH of Hamburg, Germany (e.g., under the trade designation "DISPERAL"); and Vista Chemical Company of Houston, TX (e.g., under the trade designations "DISPAL", "CATAPAL A," "CATAPAL B," "CATAPAL D"). These aluminum oxide monohydrates are in the alpha form, and include relatively little, if any, hydrated phases other than monohydrates (although very small amounts of trihydrate impurities can be present in some commercial grade boehmite, which can be tolerated). They typically have a low solubility in water, and have a high surface area (typically at least about 180 m²/g). Boehmite typically includes at least about 2–6 percent by weight free water (depending on the humidity) on its surface, and such water contributes to the amount of liquid medium in the dispersion.

Preferably, the boehmite used in the method according to the present invention has an average ultimate particle size of less than about 20 nanometers (more preferably, less than about 12 nanometers), wherein "particle size" is defined by the longest dimension of a particle.

Suitable acids, which are believed to function as a peptizing agent, also referred to as a dispersant, include monoprotic acids and acid compounds, such as acetic, hydrochloric, formic, and nitric acid. Nitric acid is a preferred peptizing agent. Some commercial sources of boehmite may contain acid titer, such as absorbed formic or nitric acid on the surface thereof. The amount of acid used depends, for example, on the dispersibility of the boehmite, the percent solids of the dispersion, the components of the dispersion, the amounts, or relative amounts of the components of the dispersion, the particle sizes of the components of the dispersion, and/or the particle size distribution of the components of the dispersion. Typically, the dispersion contains at least 3% to 8% by weight acid, based on the weight of boehmite in the dispersion.

The amount of metal oxide and/or metal oxide precursor (that is in addition to the alumina provided by the boehmite) present in a dispersion or precursor material (or metal oxide in the case of the abrasive grain) may vary depending, for example, on which metal oxide(s) is present and the properties desired for the sintered abrasive grain. Certain dispersions utilized in the method according to the present invention comprise, on a theoretical metal oxide basis, at least 0.1 percent by weight (preferably in the range from at least 0.1 percent to about 10 percent by weight; more preferably, in the range from about 0.5 to about 10 percent), based on the total theoretical metal oxide content of the dispersion, of at least one metal oxide precursor (e.g., a salt such as a metal nitrate, a metal acetate salt, a metal citrate salt, a metal formate salt, a metal formate salt, a metal chloride salt, and hydoxy iron polymer) that converts to a metal oxide upon decomposition by heating, and/or particles of metal oxide which may have been added as a particulate (preferably having a particle size (i.e., the longest dimension) of less than about 5 micrometers; more preferably, less than about 1 micrometer) and/or added as a metal oxide sol.

More generically with regard to methods according to the present inventions, the metal oxides (that are in addition to the alumina provided by the boehmite) are present, on a theoretical metal oxide basis, up to about 10 percent by weight (preferably, in the range from about 0.1 to about 10 percent; more preferably, in the range from about 0.5 to about 10 percent by weight), based on the total metal oxide content of the abrasive grain, or if the abrasive grain is to be "unseeded" (i.e., prepared without the use of nucleating material), such metal oxides are preferably present in the range from about 2 to about 10 percent by weight, although the amount may vary depending, for example, on which metal oxide(s) is present.

Metal oxide precursors include metal nitrate salts, metal acetate salts, metal citrate salts, metal formate salts, and metal chloride salts. Examples of nitrate salts include magnesium nitrate ($Mg(NO_3)_2 \cdot 6H_2O$), cobalt nitrate ($Co(NO_3)_2 \cdot 6H_2O$), nickel nitrate ($Ni(NO_3)_2 \cdot 6H_2O$), lithium nitrate ($LiNO_3$), manganese nitrate ($Mn(NO_3)_2 \cdot 4H_2O$), chromium nitrate ($Cr(NO_3)_3 \cdot 9H_2O$), yttrium nitrate ($Y(NO_3)_3 \cdot 6H_2O$), praseodymium nitrate ($Pr(N_3)_3 \cdot 6H_2O$), samarium nitrate ($Sm(NO_3)_3 \cdot 6H_2O$), neodymium nitrate ($Nd(NO_3)_36H_2O$), lanthanum nitrate ($La(NO_3)_3 \cdot 6H_2O$), gadolinium nitrate ($Gd(NO_3)_3 \cdot 5H_2O$), dysprosium nitrate ($Dy(NO_3)_35H_2O$), europium nitrate ($Eu(NO_3)_3 \cdot 6H_2O$), erbium nitrate ($Er(NO_3) \cdot 5H_2O$), ferric nitrate ($Fe(NO_3)_3 \cdot 9H_2O$), zinc nitrate, and zirconium nitrate. Examples of metal acetate salts include zirconyl acetate ($ZrO (CH_3COO)_2$), magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, and dysprosium acetate. Examples of citrate salts include magnesium citrate, cobalt citrate, lithium citrate, and manganese citrate. Examples of formate salts include magnesium formate, cobalt formate, lithium formate, manganese formate, and nickel formate.

Although generally less preferred, metal chlorides may be used in place of, together with, or in addition to precursors such as the metal acetate, citrate, formate, and/or nitrate salts and/or hydroxy iron polymer. Examples of chloride salts include magnesium chloride, cobalt chloride, nickel chloride, lithium chloride, manganese chloride, yttrium chloride, praseodymium chloride, samarium chloride, neodymium chloride, lanthanum chloride, gadolinium chloride, dysprosium chloride, europium chloride, ferric chloride, zinc chloride, titanium tetrachloride, and stannic chloride. Metal nitrates, acetate, citrate, formate, and chloride salts can be made by techniques known in the art, or obtained from commercial sources such as Alfa Chemicals of Ward Hill, Mass. and Mallinckrodt Chemicals of Paris, Ky.

The colloidal metal oxide are discrete finely divided particles of amorphous or crystalline metal oxide having one or more of their dimensions within a range of about 3 nanometers to about 1 micrometer. Metal oxide sols for use in the methods according to the present invention include sols of ceria, silica, yttria, titania, lanthana, neodymia, zirconia, and mixtures thereof. Metal oxide sols are available, for example, from Nalco of Naperville, Ill.; Eka Nobel of Augusta, Ga. Silica sols include those available under the trade designations "NALCO 1115," "NALCO 1130," "NALCO 2326," NALCO 1034A," and NALCOAG 1056" from Nalco Products, Inc. of Naperville, Ill., wherein the latter two are examples of acidic silica sols; and "NYA-COL 215" from Eka Nobel, Inc. Ceria sols are available, for example, from Rhone-Ploulenc of Shelton, Conn.; Transelco of Penn Yan, N.Y.; and Fujimi Corp. of Japan. For more information on ceria, silica, or zirconia sols, see, for example, U.S. Pat. Nos. 5,429,647 (Larmie), 5,551,963 (Larmie), 5,611,829 (Monroe et al.), and 5,645,619 (Erickson et al.) the disclosures of which are incorporated herein by reference.

The metal oxide precursor in the dispersion may also be a precursor of colloidal metal oxide. Such precursors of colloidal metal oxide include a waterdispersible or water-soluble metal source that forms finely divided (1nanometer to 1 micrometer) polymers or particles of metal oxide upon heating. Although a precursor of colloidal metal oxide is a material that is capable of forming finely divided metal oxide particles, it should be understood that the precursor of colloidal metal oxide need not form colloidal metal oxide under the conditions of the reactions described herein. The term colloidal metal oxide as used herein also encompasses chemical compounds colloidal in nature that comprise metal and oxygen (e.g., colloidal clays). This term also includes coated colloidal metal oxide, such as alumina-coated silica and zirconia-coated silica.

Whether from colloidal metal oxide directly, or from other forms or sources of colloidal metal oxide, the average metal oxide particle size in the colloidal metal oxide is preferably less than about 150 nanometers, more preferably less than about 100 nanometers, and most preferably less than about 50 nanometers. In some instances, the metal oxide particles can be on the order of about 3–10 nanometers. In most instances, the colloidal metal oxide comprises a distribution or range of metal oxide particle sizes.

A preferred hydrous iron polymer has the formula [Fe—(OH)x(N03-x]n, where $2.3<x<2.5$. These polymers are known in the chemical literature (see, e.g., P. J. Murphy, A. M. Posner, and J. P. Quirk, *J. Colloid Interface Sci.*, 56,270 (1976); T. G. Spiro, S. E. Allerton, J. Renner, A. Terzis, R. Bils, and P. Saltman, *J. Am.Chem. Soc.* 88, 2721 (1966); D. L. Segal, *J. Chem. Tech. Biotechnol.* 34A 25 (1984), the disclosures of which are incorporated herein by reference.).

Typically, the use of a metal oxide modifier can decrease the porosity of the sintered abrasive grain and thereby increase the density. Certain metal oxides may react with the alumina to form a reaction product and/or form crystalline phases with the alpha alumina which may be beneficial during use of the abrasive grain in abrading applications. For example, the oxides of cobalt, nickel, zinc, and magnesium typically react with alumina to form a spinel, whereas zirconia and hafnia do not react with the alumina. Alternatively, the reaction products of dysprosium oxide and gadolinium oxide with aluminum oxide are generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such aluminates have a hexagonal crystal structure. For additional details regarding the inclusion of metal oxide (and/or precursors thereof) in a boehmite dispersion see, for example, U.S. Pat. Nos. 4,314,827 (Leitheiser et al.), 4,770,671 (Monroe et al.), 4,881,951 (Wood et al.), 5,429,647 (Larmie), and 5,551,963 (Larmie), the disclosures of which are incorporated herein by reference.

Optionally, the boehmite dispersion contains nucleating material such as alpha alumina, alpha iron oxide, and/or an alpha iron oxide precursor. Typically, nucleating material, if present, comprises, on a theoretical metal oxide basis (based on the total metal oxide content of the calcined precursor material before sintering (or the abrasive grain)), in the range from about 0.1 to about 5 percent by weight. Additional details regarding nucleating materials are disclosed, in for example, U.S. Pat. Nos. 4,623,364 (Cottringer et al.), 4,744,802 (Schwabel), 4,964,883 (Morris et al.), 5,139,978 (Wood), and 5,219,806 (Wood), the disclosures of which are incorporated herein by reference.

Sources of iron oxide, which in some cases may act as or provide a material that acts as, a nucleating agent include hematite (i.e., $\alpha$-$Fe_2O_3$), as well as precursors thereof (i.e., goethite ($\alpha$-FeOOH), lepidocrocite ($\gamma$-FeOOH), magnetite ($Fe_3O_4$), and maghemite ($\gamma$-$Fe_2O_3$)). Suitable precursors of iron oxide include ironcontaining material that, when heated, will convert to $\alpha$-$Fe_2O_3$.

Iron oxide sources can be prepared by a variety of techniques well known in the art. For example, a dispersion of hematite ($\alpha$-$Fe_2O_3$) can be prepared by the thermal treatment of iron nitrate solutions, as is described, for example, by E. Matijevic et al., *J. Colloidal Interface Science* 63,509-24 (1978), and B. Voight et al., *Crystal Research Technology*, 21, 1177–83 (1986), the teachings of which are incorporated herein by reference. Lepidocrocite ($\gamma$-FeOOH) can be prepared, for example, by the oxidation of $Fe(OH)_2$ with a $NaNO_2$ solution. Maghemite ($\gamma$-$Fe_2O_3$) can be obtained, for example, by dehydrating $\gamma$-FeOOH in a vacuum. $\gamma$-FeOOH can also be converted to $\alpha$-$Fe_2O_3$, for example, by heating or grinding $\gamma$-FeOOH in air. Goethite ($\alpha$-FeOOH) can be synthesized, for example, by air oxidation of ferrous hydroxide or by aging a dispersion of ferric hydroxide at an elevated temperature and high pH. Additional information on the preparation of oxides of iron can be found, for example, in the articles by R. N. Sylva, *Rev. Pure Applied Chemistry*. 22, 15 (1972), and T. Misawa et al., *Corrosion Science*, 14 131 (1974), the teachings of which are incorporated herein by reference.

The type of iron oxide source employed to make abrasive grain described herein can vary. Preferably, it is a crystalline particulate material. Such particulate material can be spherical, acicular, or plate-like, depending upon the crystallinity of the particles and/or the method of preparation. Whatever the shape of the particulate material, it preferably has a surface area of at least about 60 $m^2/g$ (more preferably, at least about 80 $m^2/g$, and most preferably, at least about 100 $m^2/g$), and an average particle size of less than about 1 micrometer (more preferably, less than about 0.5 micrometer). In this context, "particle size" is defined by the longest dimension of a particle. In preferred embodiments, the crystalline particles are acicular with an aspect ratio of at least about 2:1. One particularly preferred material has acicular particles with a length of about 0.04–0.1 micrometer and a width of about 0.01–0.02 micrometer. Such particles can be obtained from a variety of suppliers of magnetic media pigment such as Magnox Pulaski, Inc., Pulaski, Va. (available, for example, as an aqueous-based paste of iron oxyhydroxide ($\alpha$FeOOH), acicular particles with an average particle size of about 0.08 micrometer and a surface area of about 104.5 $m^2/g$ under the designation "GOETHITE A").

The surface area of the particulate source of iron oxide can be measured, for example, by nitrogen absorption using a Quantasorb System OS-10 from Quantachrome Corp. of Boynton Beach, Fla. The particle size can be determined by measuring the longest dimension of the particle using a variety of techniques. For example, the particle size can be measured using a Transmission Electron Microscope, whereby a micrograph is taken of a collection of the particles at appropriate magnification and then the size of the particles is measured. Another measurement technique is Quasi Elastic Light Scattering in which a stream of light is scattered by the particles. The particle size is determined by numerical analysis of the fluctuations of the intensity of light scattered by the particles.

For additional details regarding the addition of iron sources to the dispersion or ceramic precursor material see, for example, U.S. Pat. No. 5,611,829 (Monroe et al.) and 5,645,619 (Erickson et al.), the disclosures of which are incorporated herein by reference.

A dispersion is preferably prepared by gradually adding a liquid component(s) to a component(s) that is non soluble in the liquid component(s), while the latter is mixing or tumbling. For example, a liquid containing water, nitric acid, and metal salt can be gradually added to boehmite, while the latter is being tumbled such that the liquid is more easily distributed throughout the boehmite. Suitable mixers include pail mixers (available, for example, from Sears Roebuck and Co.), sigma blade mixers (available, for example, from Paul O. Abbe, Inc. of Little Falls, N.J.), and high shear mixers (available, for example, from Charles Ross & Son Co., Hauppauge, N.Y.). Other suitable mixers may be available from Eirich Machines, Inc. of Gurnee, Ill. Hosokawa-Bepex Corp. of Minneapolis, MN (including a mixer available under the trade designation "SCHUGI FLEX-O-MIX", Model FX-160); and Littleford-Day, Inc. of Florence, Ky. Other suitable preparation techniques may be apparent to those skilled in the art after reviewing the disclosure herein.

The dispersion typically gels prior to or during the deliquifying step. The addition of most modifiers can result in the dispersion gelling faster. Alternatively, ammonium acetate or other ionic species can be added to induce gelation of the dispersion. The pH of the dispersion and concentration of ions in the gel generally determines how fast the dispersion gels. Typically, the pH of the dispersion is within a range of about 1.5 to about 4. The dispersion is preferably gelled prior to the compaction step.

The dispersion (including in this context a gelled dispersion, or even partially deliquified dispersion) can be compacted, for example, by extrusion (e.g., a ram extruder or a conventional screw extruder). Examples of extruders include ram extruders, single barrel, double barrel, and segmented screw extruders. Suitable extruders are available, for example, from Loomis Products of Levitown, Pa., Bonnot Co. of Uniontown, Ohio, and Hosokawa Bepex, Minneapolis, Minn., which offers, for example, an extruder under the trade designation "EXTRUD-O-MIX", Model EM-6). Dispersions having solids levels less than about 70–75 percent by weight tend to be more suitable for extruding than are dispersions having solids levels greater than about 70–75 percent by weight. Other suitable techniques for compacting the dispersion may be apparent by those skilled in the art after reviewing the disclosure herein. In compacting the dispersion, it is understood that the dispersion is subjected to a pressure or force such as experienced, for example, in a pellitizer or die press (including mechanical, hydraulic and pneumatic or presses) an extruder (i.e., all or substantially all of the dispersion experiences the specified pressure). In general, compacting the dispersion reduces the amount of air or gases entrapped in the dispersion, which in turn generally produces a less porous microstructure, which is more desirable.

It may be preferred to select a compacting technique that provides a shaped mass (e.g., a rod, pyramid, triangular plate, diamond, or cone), or is compatible with another process step(s) to provide a shaped mass. For example, the dispersion can be extruded in the form of a rod, which can be deliquified and crushed or broken to provide smaller sized particles The compacted dispersion can also be shredded and grated. If the shaped abrasive grain is a rod, it may have a diameter of, for example, about 150–5000 micrometers, and an aspect ratio (i.e., length to width ratio) of at least one, preferably at least two, and more preferably at least five.

In another aspect, the dispersion can be molded during or after compaction. A preferred method of molding the dispersion is by pressing, for example, with a roller or spatula, the compacted dispersion into a mold (or "production tool") having a plurality of cavities therein. The dispersion is preferably deliquified (typically dried) while still within the cavities of the production mold. The dried shaped dispersion is then removed from the production tool and further processed to provide sintered abrasive grain. Optionally, the dispersion can be calcined and even sintered while still within the production tool. In situations like this, the production tool should be able to withstand the calcining and possibly sintering temperatures, or be capable of being sacrificed (i.e., burned away).

The resulting shaped precursor particles have essentially the inverse shape of the mold cavities. Example shapes of the resulting particles include pyramids (having 3 to 10 sides, not including the base) and truncated pyramids, cones and truncated cones, frustoconical shapes, posts (having any polygonal cross section), and hemispheres. Further, it is not necessary that all the cavities in a single production tool are the same size and/or shape. For example, one area of the production tool can have equilateral pyramidal cavities 800 micrometers on each side, and another area four sided truncated pyramids 600 micrometers high with each base edge being 1000 micrometers in length. A production tool in which at least two adjacent cavities are not the same is taught in PCT published application having publication No. WO 95/07797, published Mar. 23, 1995, and pending application having U.S. Ser. No. 08/567,723, filed Dec. 5, 1995, the disclosures of which are incorporated herein by reference.

The production tool can be made of any of a variety of materials (e.g., polymeric (including polycarbonate), metal, or metal alloy), but is preferably a polymeric material (e.g., polypropylene). In some instances, it is preferable to provide a release coating on the surface of the production tool to facilitate release of the shaped particles from the tool. The polymer can be a grafted polymer.

Generally, a polymeric production tool can be made by molding from a master tool. The master tool can be, for example, ceramic, composite, but is preferably metal, such as nickel or copper. A metal master tool can be made by methods such as diamond turning, knurling, or etching.

Additional details regarding the production tools, including methods for making and using such tools, can be found, for example, in U.S. Pat. Nos. 5,152, 917 (Pieper et al.), 5,435,816 (Spurgeon et al.), and 5,500,273 (Holmes et al.), PCT published application having publication No. WO 95/07797, published Mar. 23, 1995; and pending application having U.S. Ser. No. 08/567,723, filed Dec. 5, 1995, the disclosures of which are incorporated herein by reference.

Additional details regarding shaped abrasive grain are disclosed, for example, in U.S. Pat. Nos. 5,090,968 (Pellow) and 5,201,916 (Berg et al.), the disclosures of which are incorporated herein by reference.

Figure 4:
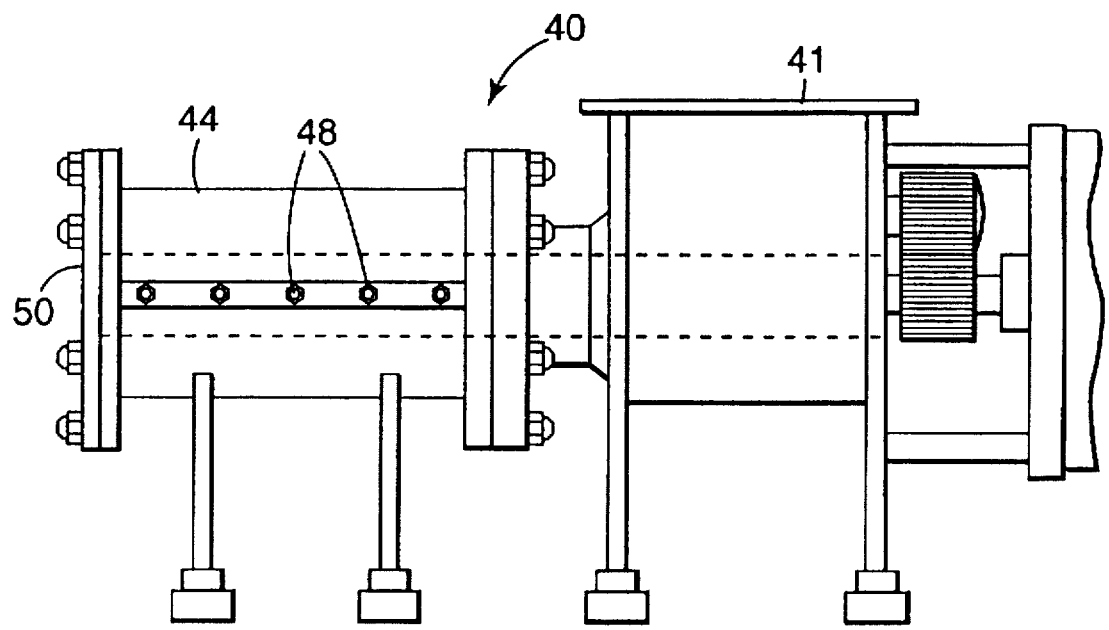
Figure 5:
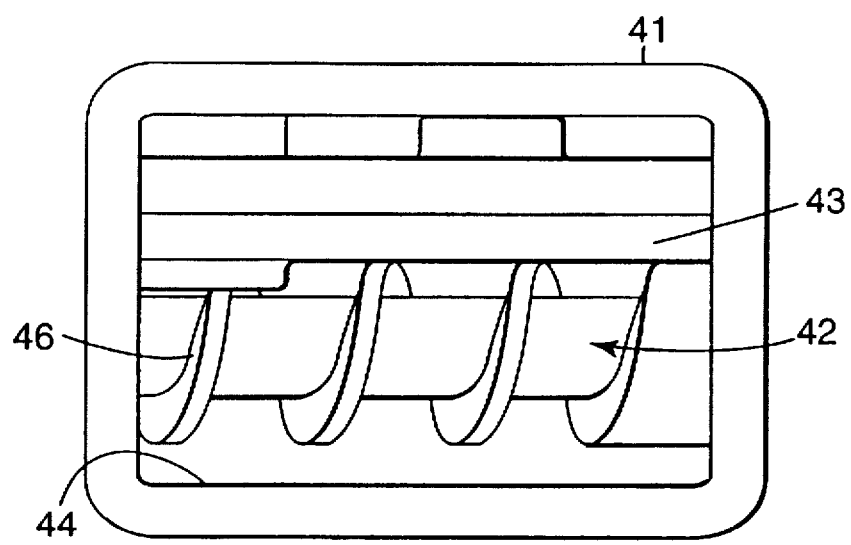
FIG. 5 is an enlarged top plan of the extruder feed port.
Figure 6:
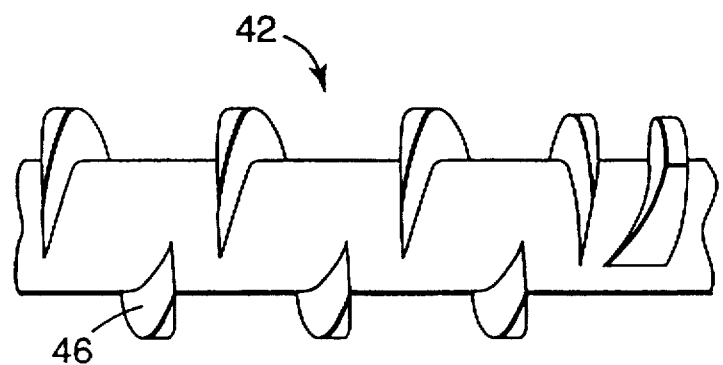

A preferred apparatus for compacting the dispersion (gelled or not) is illustrated in FIGS. 4–6. Modified segmented screw extruder 40, has feed port 41 and auger 42 centrally placed within barrel 44. FIG. 5 is a view of the interior of extruder 40 looking through feed port 41. Barrel 44 has grooves (not shown; generally known as "lands") running parallel down its length. Pins 48 extend centrally into barrel 44. Further, helical flight 46 extends the length of auger 42. Flight 46 is not continuous down the length of auger 42 but is segmented so that flight 46 on auger 42 does not come into contact with pins 48.

The dispersion (including in this context gelled dispersion) (not shown) is fed in feed port 41. Packer screw 43 forces the dispersion against auger 42 so that the dispersion is compacted by auger 42 and extruded through die 50. Die 50 can have a variety of apertures or holes therein (including a single hole or multiple holes). The die apertures can be any of a variety of cross sectional shapes, including a circle or polygon shapes (e.g., a square, star, diamond, trapezoid, or triangle). The die apertures can be any of a variety of sizes, but typically range from about 0.5 mm (0.02 inch) to 1.27 cm (0.5 inch), and more typically, from about 0.1 cm (0.04 inch) to about 0.8 cm (0.3 inch).

In general, techniques for deliquifying (including drying) the dispersion are known in the art, including heating to promote evaporation of the liquid medium, or simply drying in air. The deliquifying step generally removes a significant portion of the liquid medium from the dispersion; however, there still may be a minor portion (e.g., about 10% or less by weight) of the liquid medium present in the dried dispersion.

Irregularly shaped abrasive grain can be conveniently formed in general, for example, by placing compacted dispersion in any convenient size of drying vessel, such as one in the shape of a cake pan, drying, and then crushing.

One skilled in the art, after reviewing the disclosure herein, should be able to select other techniques for deliquifying the dispersion, as well as select appropriate conditions such as drying temperature(s), drying time(s), drying rate(s) (including the heating and/or cooling rate(s)), environment(s) (including relative humidity, pressure (i.e., atmospheric pressure or a pressure above or below the atmospheric pressure)), and/or the component(s) making up the deliquifying or drying atmosphere, other than those specifically provided herein. The more suitable deliquifying or drying conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the deliquifying technique (s), the drying temperature(s), the drying time(s), the drying rates(s), and the component(s) making up the deliquifying or drying atmosphere).

Deliquified dispersion or ceramic precursor material can be converted into smaller sized abrasive grain precursor material by any suitable conventional means (e.g., by crushing). Crushing or comminuting methods known in the art include hammer milling, roll crushing, pulverizing, and ball milling. It is much easier and requires significantly less energy to crush the deliquified dispersion than it does to crush calcined or sintered ceramic material. If the dispersion is shaped to a desired dimension and form, then the crushing or comminuting step is generally not necessary.

In general, techniques for calcining the deliquified dispersion or ceramic precursor material, wherein essentially all the volatiles are removed, and the various components that were present in the dispersion are transformed into oxides, are known in the art. Such techniques include using a rotary or static furnace to heat deliquified dispersion at temperatures ranging from about 400°–1000° C. (typically from about 500°–800° C.) until the free water, and typically until at least about 90 wt-% of any bound volatiles are removed.

One skilled in the art, after reviewing the disclosure herein, may be able to select other techniques for calcining the deliquified dispersion, as well as select appropriate conditions such as calcining temperature(s), calcining time (s), calcining rate(s), (including the heating and/or cooling rate(s)), environment(s) (including relative humidity, pressure (i.e., atmospheric pressure or a pressure above or below the atmospheric pressure)), and/or the component(s) making up the calcining atmosphere, other than those specifically provided herein. The more suitable calcining conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the calcining temperature(s), the calcining time (s), the calcining rates(s), and the component(s) making up the calcining atmosphere).

Preferred calcining temperatures are typically not greater than 800° C. (more typically in the range from about 500° C. to about 800° C. (more preferably, about 600° C. to about 700° C.). Temperatures below about 500° C. may be useful, but typically require longer calcining times. It may, however, be desirable to utilize several different calcining conditions (including different temperatures) wherein, for example, the deliquified dispersion is partially calcined for a time at a temperature(s) below about 500° C., and then further calcined at a temperature(s) above about 600° C. Temperatures above about 800° C. may also be useful, but tend to increase the amount of cracking in the sintered abrasive grain. Heating for the calcining step, which can be done, for example, using electrical resistance or gas, can be on a batch basis or on a continuous basis.

Optionally, the ceramic precursor material (typically deliquified dispersion particulate and/or calcined particulate material) can be impregnated with an impregnation composition. Typically, the impregnation composition comprises liquid medium and metal oxide, nucleating agent, and/or precursors thereof In general, methods of impregnating sol gel derived particles are described, for example, in U.S. Pat. No. 5,164,348 (Wood), the disclosure of which is incorporated herein by reference.

In general, ceramic precursor material (i.e., deliquified or dried alumina-based dispersion (or deliquified or dried ceramic precursor material), or calcined alumina-based dispersion (or calcined ceramic precursor material)) is porous. For example, a calcined ceramic precursor material generally has pores about 5–10 nanometers in diameter extending therein from an outer surface. The presence of such pores allows an impregnation composition comprising liquid medium and appropriate metal oxide and/or precursor (preferably metal salts such as the metal nitrate, acetate, citrate, and formate salts described above with regard to preparation of a dispersion) to enter into, or in the case of particulate material on the surface of, ceramic precursor material. It is also within the scope of this invention to impregnate with an aluminum salt, although typically the impregnate is a salt other than an aluminum salt. The metal salt material is dissolved in a liquid medium, and the resulting solution is then mixed with the porous ceramic precursor particle material. The impregnation process is thought to occur through capillary action. The impregnation process can be improved by subjecting the porous ceramic precursor material to vacuum treatment before or during the mixing step.

The liquid media used for the impregnating composition is preferably water (including deionized water) and/or an organic solvent (preferably a non-polar solvent). If the particulate material is calcined prior to the impregnation step, water is the preferred liquid media for the impregnation composition. If the particulate material is not calcined prior to the impregnation step, the liquid media preferred is one that will not dissolve or soften the particulate material.

The concentration of the metal salt in the liquid medium is typically in the range from about 5% to about 40% dissolved solids, on a theoretical metal oxide basis. In general, there should be at least 50 ml of solution added to achieve impregnation of 100 grams of porous ceramic precursor particulate material, preferably, at least about 60 ml of solution to 100 grams of ceramic precursor particulate material.

In some instances, more than one impregnation step may be utilized. The same impregnation composition may be applied in repeated treatments, or subsequent impregnation compositions may contain different concentrations of the same salts, different salts, or different combinations of salts.

During heat treatment of the impregnated particles to form the sintered, alpha alumina-based ceramic particles, the impregnate may react with alumina to form a reaction product. For example, the oxides of cobalt, nickel, zinc, and magnesium typically react with alumina to form a spinel structure. Yttria typically reacts with alumina to form 3Y$_2$O$_3$·5Al$_2$O$_3$, which has the garnet crystal structure. Praseodymium, samarium, ytterbium, neodymium, lanthanum, gadolinium, cerium, dysprosium, erbium, and mixtures of two or more of these rare earth metals typically react with alumina to form garnet, beta alumina, or phases exhibiting a perovskite structure. Certain rare earth oxides and divalent metal oxides react with alumina to form a rare earth aluminate represented by the formula LnMAl$_{11}$O$_{19}$, wherein Ln is a trivalent metal ion such as La, Nd, Ce, Pr, Sm, Gd, or Eu, and M is a divalent metal cation such as Mg, Mn, Ni, Zn, Fe, or Co. Such rare earth aluminates typically have a hexagonal crystal structure that is sometimes referred to as a magnetoplumbite crystal structure. Hexagonal rare earth aluminates generally have exceptional properties in an abrasive particle and if present, are typically within the abrasive particle as a whisker(s) or platelet(s). Such whiskers or platelets typically have a length of about 0.5 micrometer to about 1 micrometer, and a thickness of about 0.5 micrometer or less. These whiskers or platelets are more likely to occur in the absence of a nucleating agent.

It is also within the scope of the present invention the abrasive grain with a surface coating such as described in U.S. Pat. Nos. 1,910,440 (Nicholson), 3,041,156 (Rowse), 5,009,675 (Kunz et al.), 4,997,461 (Markhoff-Matheny et al.), and 5,042,991 (Kunz et al.), 5,011,508 (Wald et al.), and 5,213,591 (Celikkaya et al.), the disclosures of which are incorporated herein by reference.

In general, techniques for sintering the calcined or ceramic precursor material, which includes heating at a temperature effective to transform transitional alumina(s) into alpha alumina, to causing all of the metal oxide precursors to either react with the alumina or form metal oxide, and increasing the density of the ceramic material, are known in the art. As used herein, transitional alumina is any crystallographic form of alumina that exists after heating the hydrated alumina to remove the water of hydration prior to transformation to alpha alumina (e.g., eta, theta, delta, chi, iota, kappa, and gamma forms of alumina and intermediate combinations of such forms). The calcined material can be sintered, for example, by heating (e.g., using electrical resistance or gas, on batch basis (e.g., using a static furnace) or a continuous basis (e.g., using a rotary kiln)) at temperatures ranging from about 1200° C. to about 1650° C. (typically, from about 1200° C. to about 1550° C., more typically, from about 1300° C. to about 1450° C., or even from about 1350° C. to about 1450° C.). The length of time which the calcined material is exposed to the sintering temperature depends, for example, on particle size, composition of the particles, and sintering temperature. Typically, sintering times are range from a few seconds to about 60 minutes (preferably, within about 3–30 minutes). Sintering is typically accomplished in an oxidizing atmosphere, although neutral (e.g., argon or nitrogen) or reducing atmospheres (e.g., hydrogen or forming gas) may also be useful.

One skilled in the art, after reviewing the disclosure herein, may be able to select other techniques for sintering the calcined material, as well as select appropriate conditions such as sintering temperature(s), sintering time(s), sintering rate(s), (including the heating and/or cooling rate (s)), environment(s) (including relative humidity, pressure (i.e., atmospheric pressure or a pressure above or below the atmospheric pressure), and/or the component(s) making up the sintering atmosphere), other than those specifically provided herein. The more suitable sintering conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the sintering temperature(s), the sintering time (s), the sintering rates(s), and the component(s) making up the sintering atmosphere).

It may, however, be desirable to utilize several different sintering conditions (including different temperatures) wherein, for example, the calcined or ceramic precursor material is partially sintered for a time at a temperature(s) below 1200° C., and then further sintered at a temperature(s) above 1350° C.

Additional details regarding sintering can be found, for example, in U.S. Pat. Nos. 4,314,827 (Leitheiser et al.) 5,489,204 (Conwell et al.), and 5,653,775 (Plovnick et al.), the disclosures of which are incorporated herein by reference.

Sintered alpha alumina-based abrasive grain made according to the method of the present invention typically comprise, on a theoretical metal oxide basis, at least 70 percent (preferably, at least 85 percent, more preferably, at least 90 percent, 95, 98, or even 99 percent) by weight Al$_2$O$_3$, based on the total weight of the abrasive grain, and have a Vickers hardness of at least about 16 GPa (preferably, at least about 18 GPa; more preferably at least about 19 GPa; and most preferably at least about 20 GPa).

Although not wanting to be bound by theory, it is believed that when water soluble metal oxide precursor(s) is added to a dispersion having a solids level less than about 50 percent by weight, water tends to migrate to the surface where it evaporates, leading to increased level of metal oxide precursor on or near the surface. The process of water migrating to the surface continues as the dispersion is dried generally until shrinkage of the dispersion reaches a level were the drying edge reaches the interior of the dispersion being dried. This effect tends to be less pronounced at 60 percent by weight solids than at 50 percent by weight solids. A result of having an increase in the amount of metal oxide precursor on the surface is that there is a depletion or decrease in the amount of such precursor material in the interior of the dried dispersion material. Further, it is believed that when the dispersion has a solids level above about 50 percent by weight, there is less shrinkage of the dispersion, and the drying edge reaches the interior of the dispersion being dried sooner, resulting in significantly less transport of metal oxide precursor onto the surface of the dried dispersion, ultimately contributing to the preparation of sintered abrasive grain having, abrasive grain wherein the metal oxides of the abrasive grain are essentially uniformly distributed throughout the abrasive grain (i.e., embodiments of abrasive grain made according to the method of the present invention can have the metal oxide modifier essentially uniformly distributed throughout the abrasive grain).

Preferably, the concentration of the metal oxides throughout the abrasive grain is uniform such that properties thereof such as density and hardness are also uniform. For example, embodiments of abrasive grain made according to the method of the present invention can have an outer region and an inner region, the outer region being adjacent to the outer surface of the abrasive grain and the inner region being adjacent to the center of the abrasive grain, wherein the hardness from the center to the outer region of the inner region is essentially the same (i.e. ±2%), or for ease of measurement, the hardness of the inner region is essentially the same as the hardness of the outer region, based on measuring the hardness of the inner region and the outer region of at least five different abrasive grain (particles), and then comparing the average hardness of each of the respective regions to each other. The preparation of abrasive grain having uniform concentrations of metal oxides throughout the abrasive grain is facilitated by the use of a homogeneous boehmite dispersion.

The longest dimension of the alpha alumina-based abrasive grain is typically at least about 10 micrometers. The abrasive grain described herein can be readily made with a particle size of greater than about 100 micrometers, and larger abrasive grain (e.g., greater than about 150 micrometers or even greater than about 200 micrometers) can also be readily made. Generally, the preferred abrasive grain has a particle size in the range from about 10 to about 600 micrometers (typically in the range from about 10 to about 500 micrometers), although other sizes are also useful, and may even be preferred for certain applications.

The dried, calcined, and/or sintered materials provided during or by the method according to the present invention, are typically screened and graded using techniques known in the art. For example, the dried particles are typically screened to a desired size prior to calcining. The sintered abrasive grain are typically screened and grade prior to use in an abrasive application or incorporation into an abrasive article.

It is also within the scope of the present invention to recycle unused (typically particles too small in size to provide the desired size of sintered abrasive grain) deliquified dispersion material as generally described, for example, in U.S. Pat. No. 4,314,827 (Leitheiser et al.), the disclosure of which is incorporated herein by reference. For example, a dispersion can be made by preparing a first dispersion as described above, drying, crushing, and screening the dispersion material, and then making a second dispersion by combining, for example, liquid medium (preferably, water), boehmite, and deliquified material from the first dispersion, and metal oxide and/or metal oxide precursor. Optionally, the first dispersion may include nucleating material. The recycled material may provide, on a theoretical metal oxide basis, for example, at least 10 percent, at least 30 percent, at least 50 percent, or even up to (and including) 100 percent of the theoretical $Al_2O_3$ content of the dispersion which is deliquified and converted (including calcining and sintering) to provide the sintered abrasive grain.

Screening and grading of abrasive grain made according to the method of the present invention can be done, for example, using the well known techniques and standards for ANSI (American National Standard Institute), FEPA (Federation Europeenne des Fabricants de Products Abrasifs), or JIS (Japanese Industrial Standard) grade abrasive grain.

Abrasive grain made according to the method of the present invention can be used in conventional abrasive products, such as coated abrasive products, bonded abrasive products (including grinding wheels, cutoff wheels, and honing stones), nonwoven abrasive products, and abrasive brushes. Typically, abrasive products (i.e., abrasive articles) include binder and abrasive grain, at least a portion of which is abrasive grain made according to the method of the present invention, secured within the abrasive product by the binder. Methods of making such abrasive products are well known to those skilled in the art. Furthermore, abrasive grain made according to the method according to the present invention, can be used in abrasive applications that utilize slurries of abrading compounds (e.g., polishing compounds).

Coated abrasive products generally include a backing, abrasive grain, and at least one binder to hold the abrasive grain onto the backing. The backing can be any suitable material, including cloth, polymeric film, fibre, nonwoven webs, paper, combinations thereof, and treated versions thereof. The binder can be any suitable binder, including an inorganic or organic binder. The abrasive grain can be present in one layer or in two layers of the coated abrasive product. Preferred methods of making coated abrasive products are described, for example, in U.S. Pat. Nos. 4,734,104 (Broberg), 4,737,163 (Larkey), 5,203,884 (Buchanan et al.), 5,378,251 (Culler et al.), 5,417,726 (Stout et al.), 5,436,063 (Follett et al.), 5,496,386 (Broberg et al.), and 5,520,711 (Helmin), the disclosures of which are incorporated herein by reference.

The coated abrasive product can have an attachment means on its back surface to secure the coated abrasive product to a support pad or backup pad. Such attachment means can be, for example, a pressure sensitive adhesive or one side of a hook and loop attachment. The back side of the coated abrasive product may also contain a slip resistant or frictional coating. Examples of such coatings include an inorganic particulate material (e.g., calcium carbonate or quartz) dispersed in an adhesive.

An example of a coated abrasive product is depicted in FIG. 1. Referring to this figure, coated abrasive product 1 has a backing (substrate) 2 and abrasive layer 3. Abrasive layer 3 includes abrasive grain 4 secured to a major surface of backing 2 by make coat 5 and size coat 6. In some instances, a supersize coat (not shown) is used.

Figure 2:
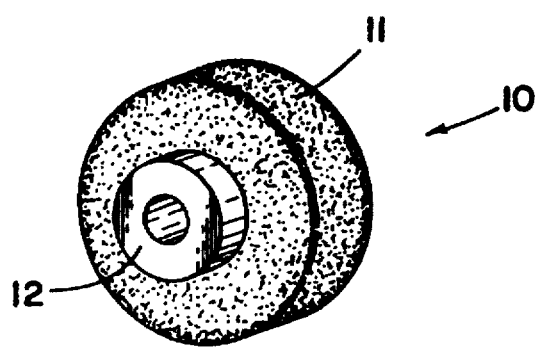
FIG. 2 is a perspective view of a bonded abrasive article including abrasive grain made according to the method of the present invention.

Bonded abrasive products typically include a shaped mass of abrasive grain held together by an organic, metallic, or vitrified binder. Such shaped mass can be, for example, in the form of a wheel, such as a grinding wheel or cutoff wheel. It can also be in the form, for example, of a honing stone or other conventional bonded abrasive shape. It is preferably in the form of a grinding wheel. Referring to FIG. 2, grinding wheel 10 is depicted, which includes abrasive grain 11, at least a portion of which is abrasive grain made according to the method of the present invention, molded in a wheel and mounted on hub 12. For further details regarding bonded abrasive products, see, for example, U.S. Pat. No. 4,997,461 (MarkhoffMatheny et al.), the disclosure of which is incorporated herein by reference. Preferred binders that can be used are curable at temperatures and under conditions that will not adversely affect the abrasive grain.

Figure 3:
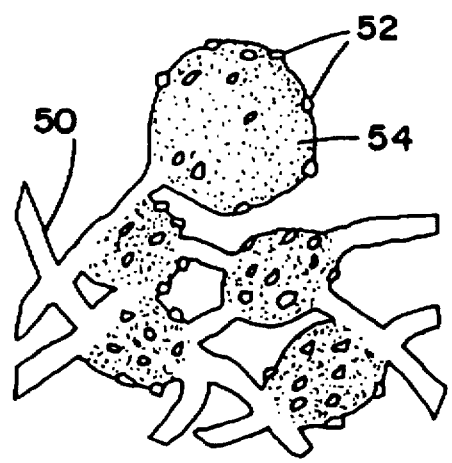
FIG. 3 is an enlarged schematic view of a nonwoven abrasive article including abrasive grain made according to the method of the present invention.

Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 50 as a substrate, onto which abrasive grain 52, at least a portion of which is abrasive grain made according to the method of the present invention, are adhered by binder 54. For further details regarding nonwoven abrasive products, see, for example, U.S. Pat. No. 2,958,593 (Hoover et al.), the disclosure of which is incorporated herein by reference.

Useful abrasive brushes including abrasive grain made according to the method of the present invention include those having a plurality of bristles unitary with a backing (see, e.g., pending application having U.S. Ser. No. 08/431, 910, filed Apr. 28, 1995, the disclosure of which is incorporated herein by reference). Preferably, such brushes are made by injection molding a mixture of polymer and abrasive grain.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, and combinations thereof The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or a filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–160 g/m$^2$) of coated abrasive product.

Abrasive grain made according to the method of the present invention, can include a surface coating. Surface coatings are known to improve the adhesion between the abrasive grain and the binder in abrasive products, and in some cases to improve the abrading properties of the abrasive grain. Such surface coatings are, for example, described in U.S. Pat. Nos. 5,011,508 (Wald et al.), 5,009,675 (Kunz et al.), 4,997,461 (Markhoff-Matheny et al.), 5,213,591 (Celikkaya et al.), 5,085,671 (Martin et al.), and 5,042,991 (Kunz et al.), the disclosures of which are incorporated herein by reference.

The abrasive products can contain 100% abrasive grain made according to the method of the present invention, or they can contain a blend of abrasive grain made according to the method of the present invention with conventional abrasive grain and/or diluent particles. However, at least about 5% by weight, and preferably about 30–100% by weight, of the abrasive grain in the abrasive products should be abrasive grain made according to the method of the present invention. Examples of suitable conventional abrasive grain include fused aluminum oxide, silicon carbide, diamond, cubic boron nitride, garnet, fused alumina zirconia, and other sol-gel abrasive grain, and the like. Examples of suitable diluent particles include marble, gypsum, flint, silica, iron oxide, aluminum silicate, glass, and diluent agglomerates. Abrasive grain made according to the method of the present invention can also be combined in or with abrasive agglomerates. An example of an abrasive agglomerate is described in U.S. Pat. Nos. 4,311,489 (Kressner), 4,652,275 (Bloecher et al.), and 4,799,939 (Bloecher et al.), the disclosures of which are incorporated herein by reference.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

The % solids levels given for some of the dispersion used in the following examples are the approximate solids levels, as they do not take into account the 2–6% by weight free water commonly found on the surface of boehmite, nor the solids provided by any non-boehmite additives.

The following illustrates the effect as little as 0.1 percent by weight (calculated on a theoretical metal oxide basis as MgO), magnesium nitrate, based on the total weight of the dispersion, has on the viscosity of a 28% solids boehmite dispersion.

Sol 1 was prepared by adding 170 grams of boehmite (commercially available from Condea Chemie of Hamburg, Germany under the trade designation "DISPERAL") to 425 ml 45° C. tap water in conventional 1 liter, food grade blender (Waring blender available from Waring Products Division, Dynamics Corp. of America, New Hartford, Conn. The boehmite/water was mixed on high for 30 seconds prior to the addition of 10 grams of concentrated nitric acid. The resulting mixture was blended on high for 60 seconds.

Sol 2 was prepared as described above in Sol 1, except 1.2 grams of $Mg(NO_3)_2 \cdot 6H_2O$ solution (having, on a theoretical metal oxide basis, 10.5% MgO solids, the balance water) were added with the acid.

The viscosity of the sols were measured over time using a viscometer (available under the trade designation "BOBLIN VISCO 88BV" from Bohlin Reologi, Inc. of South Brunswick, N.J.). Due to the thixotropic nature of the sol, the viscosity was measured by turning the spindle (cup and spindle combination C 30) of the viscometer on 10 seconds prior to the time the reading was taken. The spindle was stopped after each reading. The viscosities obtained are reported in Table 1, below.

TABLE 1

| Time, min. | Sol 1 viscosity, Pascals | Sol 2 viscosity, Pascals |
|---|---|---|
| 5 | — | 0.021 |
| 6 | — | 0.031 |
| 7 | — | 0.057 |
| 8 | — | 0.092 |
| 9 | — | 0.128 |
| 10 | 0.013 | 0.168 |
| 11 | — | 0.202 |
| 12 | 0.018 | 0.233 |
| 13 | 0.020 | 0.260 |
| 14 | 0.024 | 0.290 |
| 15 | 0.030 | 0.319 |
| 16 | 0.036 | 0.337 |
| 17 | 0.044 | 0.358 |
| 18 | 0.055 | 0.380 |
| 19 | 0.068 | 0.402 |
| 20 | 0.079 | 0.420 |
| 21 | 0.093 | — |
| 22 | 0.107 | — |
| 23 | 0.120 | — |
| 24 | 0.136 | — |
| 25 | 0.149 | — |
| 26 | 0.163 | 0.663 |
| 27 | 0.176 | — |
| 28 | 0.193 | — |

TABLE 1-continued

| Time, min. | Sol 1 viscosity, Pascals | Sol 2 viscosity, Pascals |
| --- | --- | --- |
| 29 | 0.204 | — |
| 30 | 0.215 | 0.706 |
| 35 | 0.287 | 0.877 |
| 40 | 0.347 | — |

Example 1 and 2

Example 1 was prepared by mixing, using a continuous mixer, 1194 parts of boehmite ("DISPERAL") with 2864 parts of deionized water (60° C.), 72 parts of concentrated nitric acid, and 136 parts of an iron oxide dispersion (6.6% lepiocrocite particles, calculated on a theoretical basis as $Fe_2O_3$; ($\gamma$-FeOOH), aqueous dispersion (pH=5.0–5.5), about 90 to 95% of which is lepidocrocite, acicular particles with an average particle size of about 0.05 to 0.1 micrometer, a length to diameter or width ratio of about 10:1, and a surface area of about 115.3 $m^2$/g) to form a sol. The sol was dried at less than 160° C. for less than 48 hours. The dried material was crushed, and then screened to retain approximately −100+200 mesh (U.S. Standard screen sizes) particles. 500 grams of the dried gel particles were placed in a 19 liter (5 gallon) a pail mixer (30.5 cm diameter×33 cm tall (12 inch diameter×13 inches); available from Sears Roebuck and Co.). 246 grams of deionized water were sprayed (using a conventional hand pumped spray head and pump assembly, wherein the particular one used had a reference to U.S. Pat. No. 3,701,478 on it) onto the dried particles as they tumbled in the pail mixer such that the liquid more easily distributed throughout the dried particles, and eventually, the boehmite The resulting 67% solids, agglomerated material or gelled dispersion was poured into a 2.5 cm (1 inch) diameter pellet die and pressed at 15,909 kg (35,000 pounds) (using a Model M press from Fred S. Carver of Monomenie Falls, Wis.) into 2.5 cm (1 inch) diameter by 0.95 cm ($\frac{3}{8}$ inch) thick pellets. The pellets were dried at approximately 80° C. overnight in a forced air oven, and then crushed using a mortar and pestle. The crushed material was screened to approximately −20+80 mesh (U.S. Standards screen size) particles. The screened particles were calcined in a porcelain crucible in a box furnace at 600° C. for 15 minutes, and then sintered in a platinum dish in the same box furnace at 1330° C. for 15 minutes.

The density of Example 1, as measured with a He pycnometer (available under the trade designation "ACCU-PYC 1330" from Micromeritics of Norcross, Ga.) (based on an average of three readings), was 3.92 g/$cm^3$, which is about 97.4% of the theoretical density.

Example 2 was prepared as described in Example 1, except the agglomerated material was pressed under a vacuum (approximately 0.83 atm. (25 inches Hg)). The density of the sintered abrasive grain was 3.92 g/$cm^3$, which is about 97.4% of the theoretical density.

Example 3

Example 3 was prepared by spraying (as described in Example 1) 250 grams of a rare earth nitrate solution onto 500 grams of acid stabilized boehmite (commercially available from Condea under the trade designation "DISPERAL RS"), while the latter was mixing in the pail mixer, to provide a 72% solids agglomerated material. The rare earth nitrate solution was prepared by mixing a lanthanum, neodymium, and yttrium nitrate solution (having, on a theoretical metal oxide basis, 23% rare earth oxide (i.e., $La_2O_3$, $Nd_2O_3$, and $Y_2O_3$); available from Molycorp of Lourviers, Colo.) with a sufficient amount of magnesium nitrate solution (having, on a theoretical metal oxide basis, 11% MgO; available from Mallinckrodt Chemical of Paris, KY) and cobalt nitrate solution (having, on a theoretical metal oxide basis, 19% CoO; available from Hall Chemical of Wickliffe, Ohio) to provide a solution containing about 5.8% La($NO_3$)$_3$·$6H_2O$, 5.8% Nd($NO_3$)$_3$·$6H_2O$, about 7.1% Y($NO_3$)$_3$·$6H_2O$, about 14.4% Mg($NO_3$)$_2$·$6H_2O$, about 0.4% Co($NO_3$)$_2$·$6H_2O$, and the balance deionized water.

The agglomerated material was pressed at 2273 kg (5,000 pounds) under vacuum as described in Example 2. The pellets were placed in a rotary cheese grater to form small slivers (i.e., about 2×10 mm) that were dried in an oven at 80° C. for 1 hour. No significant migration of the metal nitrate to the surface of the dried particles was observed when viewed under an optical microscope at 20×. These slivers were crushed with a disc pulverizer (type U.A., manufactured by Braun Corp. of Los Angeles, Calif.) and then calcined in a rotary kiln (15.24 cm inner diameter, 122 cm long stainless steel tube) at 650° C. for 3 minutes at temperature. The calcined material was sintered in a rotary kiln (7.5 cm inner diameter, 120 cm long SiC tube) at 1420° C. for 3 minutes at temperature. The density of the sintered abrasive grain was 3.93 g/$cm^3$, g/$cm^3$, which is about 97.6% of the theoretical density.

The Vickers hardness of the Example 3 abrasive grain was measured on polished cross-sections with a microhardness tester available under the trade designation "NITUTOYO MVK-VL" from Mitutoyo Corp. of Tokyo, Japan, at a load of 500 grams. Five independent readings per sample were averaged. The Vickers hardness was 18.5 GPa.

Example 4

Example 4 was prepared by spraying (as described in Example 1) a mixture of 341 grams of the rare earth nitrate solution and 50 grams deionized water onto 500 grams of acid stabilized boehmite (DISPERAL RS"), while the latter was mixing in the pail mixer. The resulting 65% solids agglomerated material was further processed as described in Example 3, except the pressing pressure was 3182 kg (7,000 pounds) and. The density of the sintered abrasive grain was 3.92 g/$cm^3$, which is about 97.4% of the theoretical density.

Example 4 abrasive grain were screened to provide equal parts by weight of screen cuts −35+40 mesh and −40+45 mesh screen cuts (U.S. Standard screen sizes). Screened abrasive grain was incorporated into coated abrasive discs. These discs had a vulcanized fiber backing (7.78 cm (7 inch) diameter with a 2.2 cm diameter center hole), electrostatically coated abrasive grain (on the outer 3.8 cm (1.5 inches) of the backing), conventional $CaCO_3$ make, cryolite size and $KBF_4$ filled epoxy supersize.

The abrasive performance of the discs were evaluated as follows. A disc was mounted on a beveled aluminum back-up pad, and used to grind the face of a stainless steel workpiece. The disc was driven at 5,500 rpm. The 1.8 mm peripheral edge of an approximately 25 cm diameter 304 stainless steel disc shaped workpiece deployed 18.5° from a position normal to the abrasive disc and rotated counter clockwise at 2 rpm, was placed into contact with the abrasive face of the abrasive disc under a load of 4 kg. The workpiece was weighed at 2 minutes intervals to determine the amount of steel removed after each two minutes of grinding. The test endpoint was 20 minutes of grinding. The performance of the abrasive grain was stated as percent of a control. The abrasive grain on the control abrasive discs were conventional sol gel abrasive grain commercially available from the 3M Company under the trade designation "321 CUBITRON". The total cut (an average of four discs) of the Example 4 coated abrasive discs was 100% of the control discs.

Example 5

Example 5 was prepared by slowly adding 40 grams of polyethylene glycol (commercially available from Union Carbide Corp. under the trade designation "CARBOWAX 20M") to 400 grams of deionized water. Next, 60 grams of nitric acid were added to the water. A mixture of 119 grams of the rare earth nitrate nitrate solution and 83 grams of the magnesium nitrate solution (11% MgO solids) were then added. This mixture was sprayed (using the spray head referred to in Example 1 equipped with a pump (available under the trade designation "MASTERFLEX L/S" having a size 16 hose from Cole Parmer of Niles, Ill.) at the rate of 150 ml/min onto 1000 grams of the boehmite ("DISPERAL"), while the latter tumbled in the pail mixer such that the liquid was more easily distributed throughout the boehmite. The resulting 65% solids material was extruded in a 20 ton ram extruder (Model 232–20L; available from Loomis Corp. of Levittown, Pa.) into 0.63 cm (¼ inch) diameter rods. The rods were dried, crushed, calcined, and sintered as described in Example 3, except the dried material was crushed using the disc pulverizer.

X-ray fluorescence (XRF) analysis of the sintered abrasive grain indicated, on a theoretical metal oxide basis, the following amounts of oxides 1.4% MgO, 1.4% $Y_2O_3$, 1.5% $La_2O_3$, and 1.4% $Nd_2O_3$. The density of the sintered abrasive grain was 3.90 g/cm$^3$, which is about 96.9% of the theoretical density.

Example 5 abrasive grain was screened to provide equal parts by weight of screen cuts –25+30 mesh and –30+35 mesh screen cuts (U.S. Standard screen sizes). Screened abrasive grain was incorporated into coated abrasive discs as described in Example 4. For evaluation, a disc was mounted on a beveled aluminum back-up pad, and used to grind the face of a 1.25 cm by 18 cm 304 stainless steel workpiece. The disc was driven at 5,500 rpm, while the portion of the disc overlaying the beveled edge of the back-up pad contacted the workpiece at about a 6 kg load. Each workpiece was ground for a one minute interval during the 10 minutes test (i.e., 10 workpieces were ground per disc). The performance of the abrasive grain was determined as percent of a control. That is the total amount of metal removed for the control example was equated to 100%, and the abrasive grain for the example was measured relative to this 100%. The control discs were made as described for Comparative Example 4, except the abrasive grain was a conventional sol gel abrasive grain available from the 3M Company of St. Paul, Minn. under the trade designation "321 CUBITRON". The total cut (an average of 4 discs) for Example 5 were 112% of the control discs.

Example 6

Example 6 describes a process to make a seeded abrasive grain in which the seed particles were generated in-situ from ferric nitrate solution, wherein it is believed that the ferric nitrate and ammonium bicarbonate reacted to form a hydroxy iron polymer.

Example 6 was prepared by dissolving 120 grams of ferric nitrate in 120 grams of deionized water, after which 24 grams of $NH_4HCO_3$ were slowly stirred in. When the bubbling had stopped, an additional 483 grams of deionized water were added. This solution was sprayed (as described in Example 5) onto 1000 grams of the acid stabilized boehmite to form gel agglomerates. This gel was tightly wrapped in aluminum foil and heated to 100° C. in a box oven for about 2 hours. The gel was removed from the dryer and then extruded through a 0.63 cm (¼ inch) orifice using the ram extruder. The extruded gel was dried at 80° C. overnight in a forced air oven, crushed, and calcined in a closed porcelain crucible in a box furnace, heated to 550° C., and then held at 550° C. for 1 hour. The calcined particles were then sintered by heating them in the box furnace to 1310° C. over a 2 minute period, and then holding them at 1310° C. for 15 minutes. The Vickers hardness of the sintered abrasive grain was 18.78 GPa.

The abrasive grain were screened to provide equal parts by weight of screen cuts –25+30 mesh and –30+35 mesh screen cuts. Screened abrasive grain was incorporated into coated abrasive discs, and tested as described in Example 5 on 1018 mild steel. Example 6 abrasive particles had a total cut (an average of four discs) of 85% of a convention iron oxide seeded sol gel alumina abrasive particle (commercially available from the 3M Company under the trade designation "201 CUBITRON").

Examples 7–9 and Illustrative Example I

Example 7 was prepared by spraying a mixture of 3.19 kg of the rare earth oxide solution, 360 grams of nitric acid, and 155 grams of deionized water (using a pump available under the trade designation "MASTERFLEX I/P" having a size 73 hose, and a spray head available under the trade designation "COLE PARMER G-83251-20", from Cole Parmer of Niles, Ill.) at the rate of 800 ml/min onto 6 kilograms of boehmite ("DISPERAL") while the latter was mixing in a paddle mixer (Model TM-60; formerly available from Toledo Kitchen Machinery Division of Toledo Scale Co. of Rochester, N.Y.). The resulting gel was extruded using a catalyst extruder (available from Bonnot Co. of Uniontown, Ohio) through a die having thirty six 0.25 cm (0.1 inch) diameter openings. The resulting extruded gel was dried at 100° C. overnight in a forced air oven and then crushed using the disc pulverizer and screened to remove particles less than 60 mesh. The dried gel was calcined in the box furnace at 500° C. for 5 hours, and then sintered to 1400° C. in the SiC rotary kiln for 3 minutes at temperature. The density of the sintered abrasive grain was 3.89 g/cm$^3$, which is about 96.6% of the theoretical density.

Example 8 was prepared as described in Example 7, except the holes in the extrusion die were 0.48 cm (³⁄₁₆ inch) in diameter. The density of sintered abrasive grain was 3.91 g/cm$^3$, which is about 97.1% of the theoretical density.

Illustrative Example I was prepared as described in Example 7, except the gel was not extruded crushed or screened. The sintered material ranged in size from about 2–10 mm and contained many voids and fissures which were open to the surface and clearly visible using an optical microscope at 20×. The density of sintered abrasive grain was 3.78 g/cm$^3$, which is about 94% of the theoretical density. It is believed that had the dried dispersion been crushed (and screened) that abrasive grain useful, for example in abrasive articles such as coated abrasive products would have been provided.

Example 10

Example 10 was prepared by first mixing 1194 parts of boehmite ("DISPERAL") with 3000 parts of acidified water (prepared by mixing 3000 parts of deionized water and 71 parts of concentrated nitric acid) using a continuous mixer to form a sol. The sol was dried at less than 160° C. for less than 48 hours. The dried material was crushed, and then screened to produce −150 mesh (U.S. Standards screen size) particles. 27.3 kilograms (sixty pounds) of the −150 mesh dried material was charged into a mixer (FM-130D; available from Littleford-Day, Inc. of Florence, Ky.), and a mixture of 14.5 kilograms (32 lbs.) of the rare earth oxide solution (which included magnesium nitrate and cobalt nitrate), and 1.1 kilograms (2. 5 lbs.) of nitric acid was sprayed into the mixer while mixing. More specifically, the solution was sprayed using a 19 liter (5 gallon) spray paint pressure vessel (available from Graco of Minneapolis, Minn.) at a rate of about 13.6 kilograms/min (30 lbs./min.) under a pressure of 2.8 kg/cm$^2$ (40 psi). The resulting gelled dispersion was extruded as described in Example 7. The extruded material was dried on a two zone conveyer belt drying oven, wherein the first zone was at a temperature of about 60° C. (140° F.) and the second zone was at about 100° C. (210° F.), and the time in each zone was about 5–10 minutes. The dried rods were further processed as described in Example 3 except the dried material was roll crushed (available from Allis Chalmers of Milwaukee, Wis.). The density of the sintered abrasive grain was 3.92 g/cm$^3$.

Example 10 abrasive grain was screened, incorporated into coated abrasive discs, and tested as described in Example 5, except the abrasive grain was screened to provide equal parts of −20+25 mesh and −25+30 mesh (U.S. Standards screen size), and testing was conducted for 15 minutes under a load of 8.2 kilograms. The total cut (an average of four discs) of the Example 10 coated abrasive discs was 112% of the control discs.

Example 11

Example 11 was prepared as described for Example 7 except the dispersion did not contain the added 155 grams of deionized water; the dispersion was dried overnight at 49° C. (120° F.); the dried material was roll crushed; the crushed material was screened to −8+20 mesh (U.S. Standards screen size); the screened material was calcined by heating it to 700° C. over a period of about 3 hours, and then holding it at 700° C. for at least 9 hours; and then sintered as described for Example The density of the Example 11 abrasive grain was 3.91 g/cm$^3$.

Several Example 11 abrasive grain were mounted onto the surface of a piece of cellophane tape (commercially available from the 3M Company under the trade designation "SCOTCH" tape) in the upright position. Epoxy resin was then poured over the rods and the resin was cured. The resin mount, having the rods therein, was polished using conventional diamond abrasive slurries to a surface finish of 1 micrometer $R_a$, finish. The resulting cross-section of rods was uniform in color. The Vickers hardness at the center of the rods (average of 17 readings) was 17.8 GPa (standard deviation of 1.2), while at the edge (average of 17 readings) it was 18.1 GPa (standard deviation of 1.4).

A thin gold coating was then applied over the resin mount, and the rods were examined with a scanning electron microscope (available under the trade designation "JEOL 840A" from JEOL of Japan). The rod samples were probed using EDAX (Energy Dispersive X-ray Analysis) at the center of the rod and within 10 micrometers of the exterior edge. The resulting spectra showed the peak heights to be the same at the center as at the edge.

As a comparison, a similar measurement on a polished cross-section of conventional sol gel alumina abrasive grain having the same composition (commercially available from the 3M Company under the trade designation "321 CUBITRON") showed increased peak heights at the edges of the abrasive grain as compared to the center. The Vickers hardness of at the center of this abrasive grain material (an average of 15 readings) was 19.3 GPa, while at the edge (average of 15 readings) it was 20.4 GPa.

Various modifications and alterations of this invention will become apparent to those skilled in the art without departing from the scope and spirit of this invention, and it should be understood that this invention is not to be unduly limited to the illustrative embodiments set forth herein.

What is claim is:

1. A method for making alpha alumina-based ceramic abrasive grain, said method comprising the steps of:
   (a) preparing a homogeneous dispersion by combining components comprising liquid medium, acid, greater than 60 percent by weight boehmite, based on the total solids content of said dispersion, and, on a metal oxide basis, at least 0.1 percent by weight, based on the total metal oxide content of said dispersion, of at least one metal oxide precursor selected from the group consisting of a metal nitrate salt, a metal citrate salt, a metal formate salt, a metal chloride salt, and hydoxy iron polymer, the amount of said boehmite is greater than 60 percent by weight, based on the total weight of said dispersion;
   (b) converting the dispersion to alpha alumina-based ceramic precursor material; and
   (c) sintering the precursor material to provide alpha alumina-based ceramic abrasive grain having a density of greater than 90 percent of theoretical.

2. The method according to claim 1 wherein the metal oxide precursor is at least one salt selected from the group consisting of a metal nitrate salt, a metal citrate salt, a metal formate salt, and hydoxy iron polymer.

3. The method according to claim 2 further comprising the step, prior to step (b), of compacting the dispersion by application of pressure of at least $3.5 \times 10^4$ kg/m$^2$.

4. The method according to claim 3 wherein said liquid medium is aqueous.

5. The method according to claim 4 wherein the metal oxide precursor is at least one salt selected from the group consisting of a metal nitrate salt, a metal acetate salt, a metal citrate salt, and a metal formate salt.

6. The method according to claim 4 wherein the metal oxide precursor is at least one of magnesium nitrate, cobalt nitrate, nickel nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, erbium nitrate, zinc nitrate, zirconium nitrate, magnesium citrate, cobalt citrate, lithium citrate, manganese citrate, magnesium formate, cobalt formate, lithium formate, manganese formate, and nickel formate, or combinations thereof.

7. The method according to claim 6 wherein in step (a), the amount of boehmite is in the range from greater than 60% to about 65% by weight, based on the total weight of said dispersion.

8. The method according to claim 4 wherein said dispersion includes a sufficient amount of at least one of metal oxide or metal oxide precursor to provide said abrasive grain comprises, on a metal oxide basis, at least 0.5 percent by weight of metal oxide selected from the group consisting of MgO, CoO, NiO, Ce$_2$O$_3$, ZrO$_2$, HfO$_2$, Li$_2$O, MnO, Cr$_2$O$_3$, Y$_2$O$_3$, Pr$_2$O$_3$, Sm$_2$O$_3$, Yb$_2$O$_3$, Nd$_2$O$_3$, La$_2$O$_3$, Gd$_2$O$_3$, Dy$_2$O$_3$, Er$_2$O$_3$, Eu$_2$O$_3$, TiO$_2$, SnO$_2$, and ZnO, based on the total metal oxide content of said abrasive grain.

9. The method according to claim 5 wherein said alpha alumina-based ceramic abrasive grain has a density of at least 97 percent of theoretical.

10. The method according to claim 5 wherein said acid is nitric acid.

11. The method according to claim 5 further including extruding the dispersion.

12. The method according to claim 11 wherein said abrasive grain are rods.

13. The method according to claim 4 further comprising the step of molding the compacted dispersion into pyramids such that said abrasive grain are pyramids.

14. A method for making alpha alumina-based ceramic abrasive grain, said method comprising the steps of:

(a) preparing a first dispersion by combining components comprising liquid medium, acid, boehmite, and metal oxide precursor;

(b) drying said first dispersion to provided first alpha alumina-based precursor material;

(c) combining components comprising aqueous liquid medium, boehmite, and said first alpha alumina-based precursor material to provide a second, homogeneous dispersion comprising aqueous liquid medium, acid, greater than 60 percent by weight boehmite, based on the total solids content of said dispersion, and, on a metal oxide basis, at least 0.1 percent by weight, based on the total metal oxide content of said dispersion, of at least one metal oxide precursor selected from the group consisting of a metal nitrate salt, and a metal formate salt, the amount of said boehmite is greater than 60 percent by weight, based on the total weight of said dispersion;

(d) converting said second dispersion to second alpha alumina-based ceramic precursor material; and (e) sintering said second precursor material to provide alpha alumina-based ceramic abrasive grain having a density of greater than 90 percent of theoretical.

wherein said method further comprises the step, prior to step (d), of compacting the second dispersion by application of pressure of at least $3.5 \times 10^4$ kg/m$^2$.

15. The method according to claim 5 wherein said dispersion contains, on a metal oxide basis, less than 0.05 percent by weight of nucleating material, based on the total metal oxide content of said dispersion.

16. The method according to claim 5 wherein said dispersion contains, on a metal oxide basis, less than 0.05 percent by weight nucleating agent, based on the total metal oxide content of said dispersion.

17. The method according to claim 5 wherein said dispersion contains, on a metal oxide basis, less than 0.05 percent by weight of alpha alumina seeds, based on the total metal oxide content of said dispersion.

18. The method according to claim 5 wherein said abrasive grain has an essentially uniform hardness.

19. The method according to claim 5 wherein said dispersion has a solids content of at least 61 percent by weight, based on the total weight of said dispersion.

20. The method according to claim 5 wherein in step (a), the amount of boehmite is at least 62 percent by weight, based on the total weight of said dispersion.

21. The method according to claim 3 wherein the metal oxide precursor is at least one salt selected from the group consisting of a metal nitrate salt, a metal acetate salt, a metal citrate salt, and a metal formate salt.

22. The method according to claim 1 wherein the metal oxide precursor is at least one salt selected from the group consisting of a metal nitrate salt, a metal acetate salt, a metal citrate salt, and a metal formate salt.

23. A method for making an abrasive article, said method comprising the steps of:

(a) preparing a homogeneous dispersion by combining components comprising liquid medium, acid, greater than 60 percent by weight boehmite, based on the total solids content of said dispersion, and, on a metal oxide basis, at least 0.1 percent by weight, based on the total metal oxide content of said dispersion, of at least one metal oxide precursor selected from the group consisting of a metal nitrate salt, a metal citrate salt, a metal formate salt, and hydoxy iron polymer, the amount of said boehmite being greater than 60 percent by weight, based on the total weight of said dispersion;

(b) compacting the dispersion by applying a pressure of at least $3.5 \times 10^4$ kg/m$^2$ to the dispersion;

(c) converting the compacted dispersion to alpha alumina-based ceramic precursor material;

(d) sintering the precursor material to provide alpha alumina-based ceramic abrasive grain having a density of greater than 90 percent of theoretical; and (e) combining at least a plurality of said alpha alumina-based ceramic abrasive grain with binder to provide an abrasive article.

24. The method according to claim 23 wherein said abrasive article is a coated abrasive article that includes a backing.

25. The method according to claim 24 wherein step (e) includes combining fused alumina abrasive grain with said binder.

26. The method according to claim 4 wherein the metal oxide precursor is at least one of magnesium nitrate, cobalt nitrate, nickel nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, erbium nitrate, zinc nitrate, zirconium nitrate, magnesium citrate, cobalt citrate, lithium citrate, manganese citrate, magnesium formate, cobalt formate, lithium formate, manganese formate, and nickel formate, or combinations thereof; and wherein said abrasive grain comprises, on a metal oxide basis, at least 0.5 percent by weight of metal oxide selected from the group consisting of MgO, CoO, NiO, $ZrO_2$, $Li_2O$, MnO, $Cr_2O_3$, $Y_2O_3$, $Sm_2O_3$, $Nd_2O_3$, $La_2O_3$, $Gd_2O_3$, $Dy_2O_3$, $Eu_2O_3$, $Er_2O_3$, and ZnO, based on the total metal oxide content of said abrasive grain.

\* \* \* \* \*

UNITED STATES PATENT AND TRADEMARK OFFICE
CERTIFICATE OF CORRECTION

PATENT NO. : 5,779,743  
DATED : July 14, 1998  
INVENTOR(S) : William P. Wood

It is certified that error appears in the above-identified patent and that said Letters Patent is hereby corrected as shown below:

Column 1,  
Line 32, insert -- . -- after "thereof"

Column 3,  
Line 33, ".05" should read -- 0.05 --

Column 8,  
Line 27, insert -- . -- after "thereof"

Column 10,  
Line 45, insert -- 5,551,963 (Larmie) -- after "example"

Column 11,  
Line 39, insert -- . -- after "particles"

Column 14,  
Line 13, insert -- . -- after "thereof"

Column 15,  
Line 31, "causing" should read -- cause --

Column 19,  
Line 7, insert -- . -- after "thereof"

Column 22,  
Line 32, "NITUTOYO" should read -- MITUTOYO --

Signed and Sealed this

Thirtieth Day of July, 2002

*Attest:*

JAMES E. ROGAN  
*Attesting Officer*     *Director of the United States Patent and Trademark Office*